Oct. 17, 1950

T. C. FRASER 2,526,072

SLIPPER BEARING

Filed Feb. 8, 1947

4 Sheets-Sheet 1

Inventor:
Thomas C. Fraser
By: Wallace and Cannon
Attorneys

Oct. 17, 1950 T. C. FRASER 2,526,072

SLIPPER BEARING

Filed Feb. 8, 1947 4 Sheets-Sheet 2

Inventor:
Thomas C. Fraser
By: Wallace and Cannon
Attorneys

Oct. 17, 1950 T. C. FRASER 2,526,072

SLIPPER BEARING

Filed Feb. 8, 1947 4 Sheets-Sheet 3

Inventor:
Thomas C. Fraser
By: Wallace and Cannon
Attorneys

Inventor:
Thomas C. Fraser
By: Wallace and Cannon
Attorneys

Patented Oct. 17, 1950 2,526,072

UNITED STATES PATENT OFFICE 2,526,072

SLIPPER BEARING

Thomas C. Fraser, Detroit, Mich., assignor to American Brake Shoe Company, Wilmington, Del., a corporation of Delaware Application February 8, 1947, Serial No. 727,369

15 Claims. (Cl. 64—7)

This invention relates to bearings and particularly to slipper bearings for universal couplings and the like.

Where power is to be transmitted between two shafts that are disposed in an end to end relationship, it is usually desirable to connect such shafts by means of a universal coupling so that misalignment of the two shafts will not cause breakage in the power transmitting connection between the two shafts. Many different types of universal couplings are employed under such circumstances, the particular type that is employed being determined in a large measure by the environment in which the coupling is to be used and the character and amount of the torque loads that are to be transmitted. In one conventional form of universal coupling that has been widely used for the transmission of relatively heavy loads, cooperating male and female members are respectively formed on or secured to the adjacent ends of the shafts that are to be connected, the male member including a longitudinally projecting flat tongue or fishtail which is inserted into a bifurcation that is afforded in the female member. The branches or arms of the bifurcated female member are arcuately recessed transversely with respect to the axis of the shaft upon which the female member is mounted, and such recesses are located so as to be disposed in opposing relation to the opposite side faces of the tongue when the tongue is inserted into the bifurcation, and this serves to define a pair of opposed semi-cylindrical pockets affording arcuate bearing surfaces located on opposite sides of the tongue. Each of the aforesaid pockets or recesses serves to receive a slipper bearing and such slipper bearing has a convex bearing surface that conforms to the arcuate bearing surface of the recess, and it also has an oppositely facing flat bearing face that conforms to the adjacent flat face of the tongue, and a shouldered bearing pin which passes through a suitable opening or slot in the tongue serves to maintain the slipper bearings in spaced relation. Where the connected shafts are so located that they are not in axial alignment, the angular relation of the tongue and the female member changes constantly so that the slipper bearings rock within the recesses in the female member and upon the arcuate bearing surfaces afforded in such recess, while the tongue pivots about the bearing pin and in contact with the flat bearing face of the slipper bearings, and thus two angularly related axes are afforded in such a coupling about which the associated shafts may pivot in the course of such rotation of the shafts.

In a universal coupling of the character described, it is customary to afford a boss which has an opening therein that serves as a socket to receive the reduced end of the spacing or bearing pin, and this boss section is usually of a greater thickness than the end portions of the bearing. The arcuate recesses are accordingly made somewhat deeper at the central portions where the boss section is to be located, thereby to afford shoulders against which the end edges of the boss sections may bear so as to hold the slipper bearings in a properly centered relationship within the recesses endwise thereof.

In a universal coupling of the aforesaid character, the major portion of the wear upon the parts of the coupling has been found to occur near the end portions of the arcuate bearing surfaces of the slipper bearings and near the end portions of the arcuate bearing recesses in the female member, and the amount of wear becomes progressively greater toward the outer edges of the coupling. The female portions of such a coupling of course become worn, and when it becomes necessary to replace one slipper bearing with another, there are instances where, until the new slipper bearing becomes worn so as to conform with the worn portions of the female member, the slipper bearing will be subjected to appreciable stresses which tend to break the slipper bearing. Under such circumstances, the application of driving torque between the two members of the coupling tends to bend the slipper bearing so as to conform with the worn surfaces of the female member of the coupling, and this action tends to produce breakage of the slipper bearings adjacent to the boss portion thereof. Such breakage may of course occur at any time during the life of such a slipper bearing, and when such breakage occurs, it is necessary to stop the machine that is being driven by the universal coupling and to remove the broken slipper bearing and replace the same with a new slipper bearing. In the Healy Patent No. 2,305,696, patented December 22, 1942, a slipper bearing structure is disclosed wherein each slipper bearing is made in three pieces so as to afford separately formed end sections disposed at opposite ends of a separately formed central or boss section, and means are afforded for holding the end sections in the position in such a way that these end sections may be released and removed without the necessity for disconnecting the male and female members of the universal coupling. In the Healy Patent No. 2,305,697, and in the Irvin Patent No. 2,305,698, slipper bearing arrangements are disclosed wherein separately formed end sections are pivotally related to separately formed central or boss sections in such a way that endwise removability of the end sections is attained, and in addition, the end sections are permitted to adjust themselves to the worn bearing surfaces of the universal coupling without the creation of undue stresses and strains between the connected parts of the slipper bearing. In the Irvin Patent No. 2,305,702, and in the Smith Patent No. 2,305,703, other forms of slipper bearing construction are illustrated wherein endwise removability of the end sections of the slipper bearings is attained while at the same time providing for limited readjustment of the relationship of the parts of the slipper bearings without the creation of undue stresses between the connected parts.

The present invention constitutes an improvement upon the construction shown in the aforesaid Healy, Irvin and Smith patents, and the primary object of the present invention is to enable separately formed end sections and boss sections in a slipper bearing to be related one to the other in such a manner as to reduce the stresses upon the metallic parts that are used in connecting such elements of the slipper bearings, and an object related to the foregoing is to enable metallic elements utilized in associating such parts of a slipper bearing to be disposed about the edges of such slipper bearings, thereby to avoid the necessity for drilling or molding bores or other openings in such slipper bearings which might tend to weaken such slipper bearings.

Other important objects of the present invention are to simplify the connecting means utilized in holding the separately formed elements of a multi-element slipper bearing together; to simplify the connection of such securing elements to the end sections of such a slipper bearing; to associate such holding or retaining elements with the elements of such a slipper bearing in such a way that these connecting elements will not be subjected to bending stresses at a particular point which might tend to cause breaking or crystallization of the connecting elements at this point.

As hereinbefore pointed out, it has been found in practice that the major portion of the wear in a universal coupling of the type hereinbefore described takes place at the point where the arcuate bearing surface thereof engages the arcuate surface of the female member of the coupling, and a further important object of the present invention is to enable end sections for use in a three-part slipper bearing to be so constructed that each end section has the arcuate bearing surface thereof afforded as a removable or replaceable element. Another and related object is to enable each end section in such a multi-part slipper bearing to be made in two parts, one of which is arranged for bearing contact with the flat surface of the tongue of the fishtail, while the other is arranged for contact with the arcuate surface of the female member of a universal coupling. More specifically, it is an object of this invention to afford a two-element end section for such a slipper bearing, and to make the arcuate bearing element thereof from a molded composition bearing material while making the flat surface element thereof from a suitable bearing metal. Another object is to afford means for detachably associating such an arcuate bearing member and the flat base element to form the end section of a slipper bearing, and to enable the two elements of such an end section to be readily assembled and disassembled.

A further object of the present invention is to enable removable end sections of such a three-part slipper bearing to be connected together by connecting straps or bars extending along the side edges of the end sections and the boss section, and to enable such connection to be attained by pivotal means affording pivotal axes disposed perpendicular to the axis of the socket of the boss section.

Other and further objects are to afford attaching ears on the end sections so as to extend outwardly from the outer ends or corners of such end sections, and to afford connecting openings in such connecting ears so as to be disposed parallel to the flat bearing surface of such end sections and also parallel to the adjacent end face of the end section.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
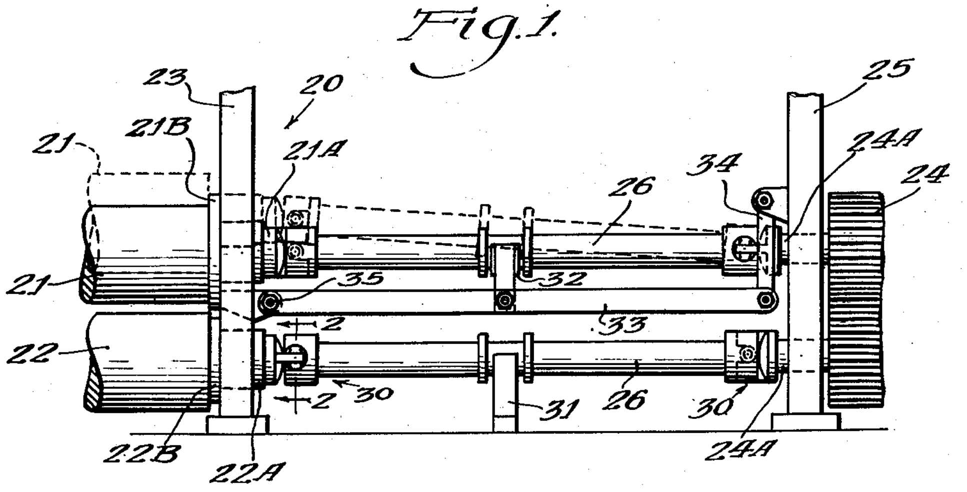
Fig. 1 is a fragmentary elevational view of a portion of a rolling mill in which slipper bearings of the present invention may be employed.

For purposes of disclosure, the invention has been herein illustrated as mounted in a rolling mill 20 which may be of either the reversing or continuous type. The rolling mill 20 includes opposed upper and lower rolls 21 and 22 that have reduced ends or pintles 21A and 22A respectively that extend through and are journaled in bearings 21B and 22B. Bearings 21B and 22B are supported for vertical adjustment in an upstanding frame member 23, and the rolls are driven from gearing 24 that is disposed in substantially spaced relation with respect to the rolls 21 and 22 and on the opposite side of another upstanding frame member 25. The gearing 24 has projecting stub shafts 24A extended through the frame member 25, and connecting drive spindles 26 are extended between the stub shafts 24A and the reduced ends 21A and 22A of the rolls 21 and 22. The opposite ends of the spindles 26 are connected respectively to the gearing 24 and to the rolls 21 and 22 by universal couplings 30, and it is in such couplings 30 that the slipper bearings of the present invention are employed. It will be observed that the lower spindle 26 has a central thrust bearing 31 which supports the spindle and holds the same against undue movement in an endwise direction, and a similar bearing 32 is afforded for the upper spindle 26, such bearing 32 being supported on a carrier bar 33. The carrier bar 33 is supported at its right hand end by a link 34 that is suspended from the frame member 25, while the other end of the bar 33 is pivoted at 35 on the upper bearing 21B so as to maintain the bearing at 32 in a proper relation to the upper spindle 26 as the upper roll 21 is adjusted, as for example, from the full line position of the Fig. 21 to the dotted position. It is when the roll 21 and the driving spindle 26 thereof are thus misaligned that the universal action of the couplings 30 comes into play.

The universal couplings 30 each comprise a male member 30M and a female member 30F and these members are in the form of heads which may be formed on the elements that are to be connected by the couplings, or these heads may be separately formed. The male member 30M has a flat and relatively thick tongue 30T projecting from the rounded end surface thereof, and when the elements of the coupling are in assembled relation, this tongue 30T enters into a slot 30S that is formed into the end of the female member 30F so as to afford bifurcations 30B. Between the two bifurcations 30B, an arcuate bearing recess 40 is formed on an axis that is perpendicular to the axis of the head 30F, and substantially midway between the ends of the arcuate bearing recess 40, this recess is made substantially deeper as at 40B, thereby to afford spaced shoulders 40S along opposite sides of the recesses 40B.

Figure 2:
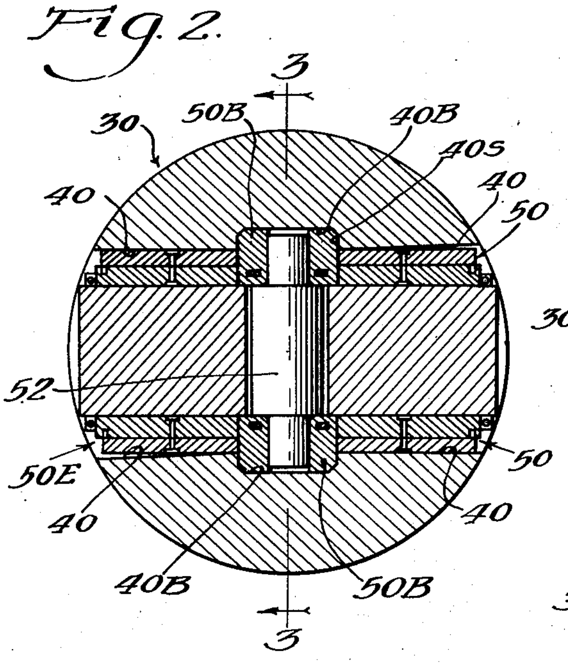
Fig. 2 is an enlarged transverse cross sectional view, taken along the line 2—2 of Fig. 1 and showing a slipper bearing constructed in accordance with the present invention and in position in a universal coupling.
Figure 3:
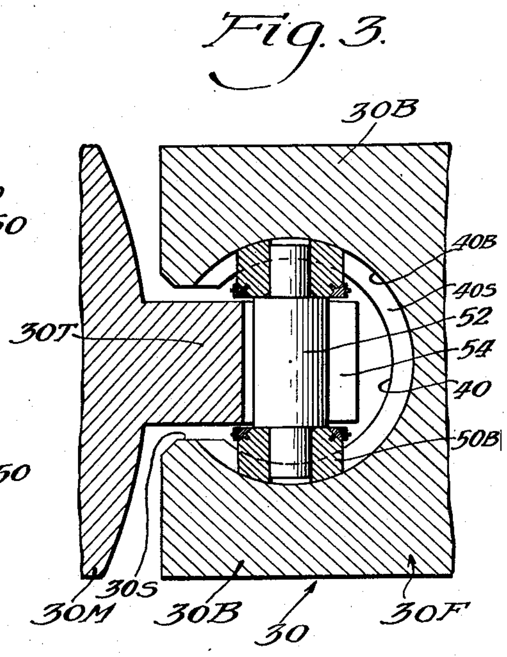
Fig. 3 is a fragmentary longitudinal sectional view taken substantially along the line 3—3 of Fig. 2.

A pair of slipper bearings 50 are respectively interposed between the tongue 30T and the arcuate recesses that are afforded between the arms 30B of the female member 30F, and each slipper bearing 50 affords complemental surfaces for engagement respectively with the arcuate bearing surfaces of the female member 30F and the opposed flat surfaces of the tongue 30T. The central portion of each slipper bearing 50 is somewhat thicker than the remaining portions of the slipper bearing so that this medial portion of each slipper bearing extends into the deepened portion 40B of the recess in the female element 30F of the universal coupling. Such medial portions of the slipper bearings are separately formed and are herein designated as boss sections 50B, and end sections 50E are extended from opposite ends of the boss sections 50B to substantially the outer ends of the arcuate bearing recesses 40 of the female member 30F. The two boss sections 50B are held in spaced relation by a shouldered bearing pin 52, the reduced ends of which extend into sockets 53 that are formed centrally of the boss sections 50B, this relationship being shown in Figs. 2 and 3 of the drawings. When the coupling is in its assembled relation, the bearing pin 52 is embraced within a slot 54 that is formed in the end of the tongue 30T, and the relationship of the pin 52 with the slot 54 affords a pivotal axis about which the elements of the coupling may move, it being observed of course that the slipper bearings 50 ride in the arcuate recesses 40 to afford a second pivotal axis so that the assembly constitutes a universal coupling.

Figure 4:
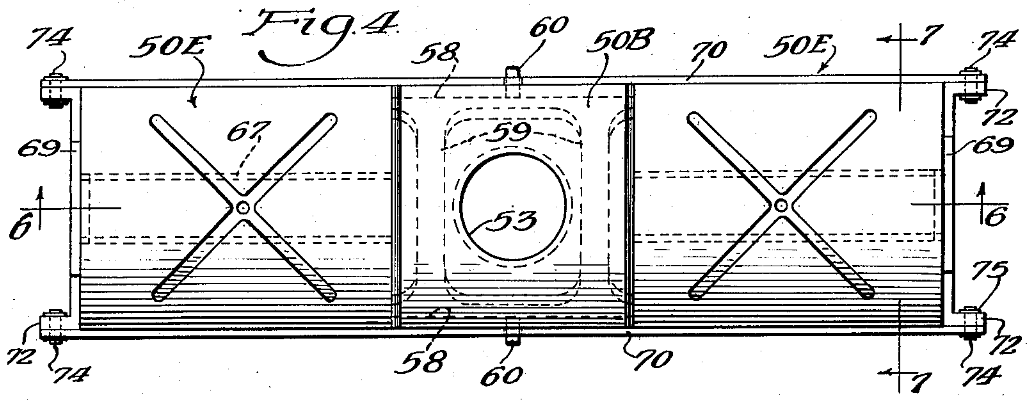
Fig. 4 is a plan view of a slipper bearing embodying the features of the invention.
Figure 5:
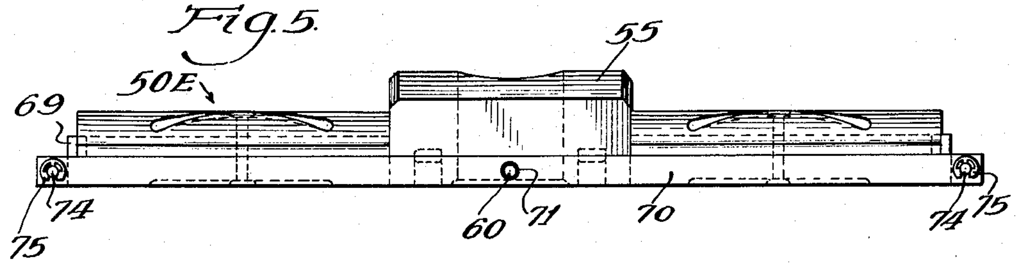
Fig. 5 is a side elevational view of the slipper bearing shown in Fig. 4.
Figure 6:
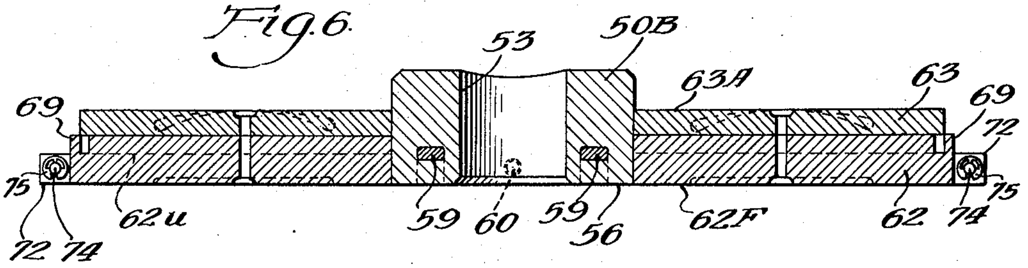
Fig. 6 is a longitudinal cross sectional view taken substantially along the line 6—6 of Fig. 4.
Figure 7:
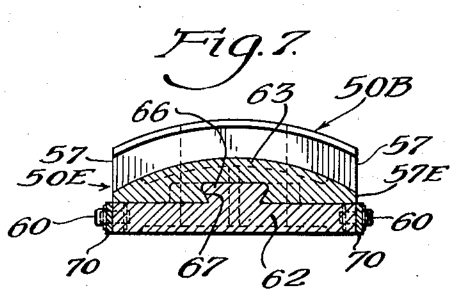
Fig. 7 is a transverse cross sectional view taken substantially along the line 7—7 of Fig. 4.
Figure 8:
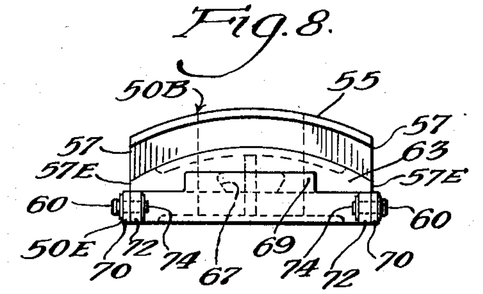
Fig. 8 is an end view taken from the right in Fig. 4.

The boss section 50B is in the present instance illustrated as being molded from a composition bearing material and because of this, the boss section 50B has reinforcing means molded therein so as to impart additional strength and wearing qualities thereto. The boss 50B is of course formed with an arcuate bearing surface 55 and a flat bearing surface 56 and these surfaces 55 and 56 are joined by edge surfaces 57. At the juncture of the surfaces 56 and 57, the boss section 50B has corner beads molded therein, as indicated at 58 in Fig. 4, and these corner beads take the general form of the reinforcing corner beads illustrated in Irvin Patent No. 2,361,629, patented October 31, 1944. These corner beads are described in greater detail hereinafter with respect to the embodiment of the invention shown in Figs. 15 to 20, but it should be herein pointed out that connecting elements 59 are extended between the corner beads 58 so as to be disposed in the body of the boss section on opposite sides of the socket 53. The corner beads 58 and the connecting members 59 are both formed from a suitable bearing metal, thereby to impart additional strength to the boss section 50B. For purposes that will hereinafter become apparent, each corner bead 58 has a supporting pin 60 fixed therein with a press fit and extended outwardly beyond the side surfaces 57 of the boss section.

The end sections 50E of the slipper bearing 50 are, in the form of the invention shown in Figs. 1 to 14, comprised in each instance from a pair of separably formed elements, one of which may be termed a base member 62 while the other of which may be termed a cap member 63, these parts being individually designated in Figs. 4 to 8 of the drawings and being separately illustrated respectively in Figs. 12 to 14 and 9 to 11.

The base member 62 and the cap member 63 are both generally rectangular in form, and the base member has a flat bottom surface 62F that is adapted to bear upon the flat side surface of the tongue 30T of the universal coupling. The base member 62 is therefore made of a suitable bearing metal, and means are afforded whereby the cap member 63 may be secured in place on the other face of the base member 62 so as to thereby afford an arcuate bearing surface 63A for bearing engagement with the arcuate recess 40 of the female member of the coupling.

Figure 9:
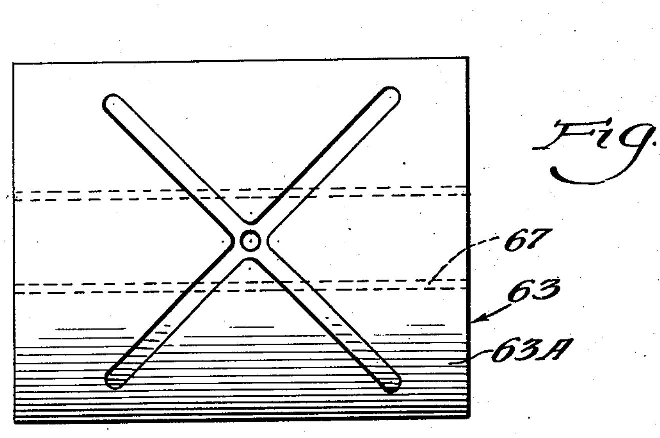
Fig. 9 is a plan view of the upper or replaceable arcuate element of one end section of the slipper bearing shown in Fig. 4.
Figure 10:
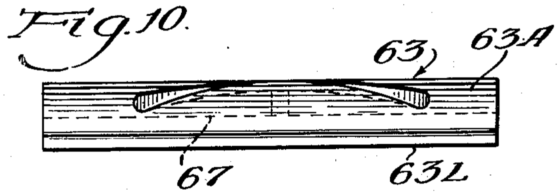
Fig. 10 is a side elevational view of the element shown in Fig. 9.
Figure 11:
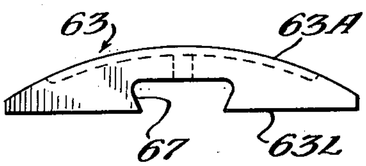
Fig. 11 is an end view of the element shown in Fig. 9.
Figure 12:
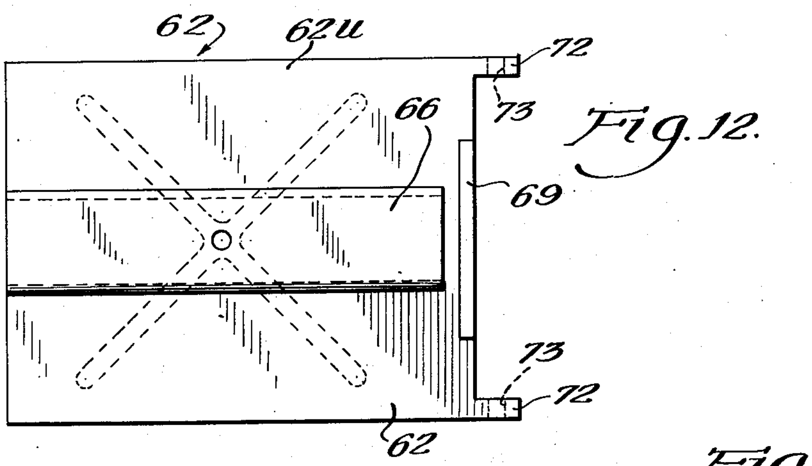
Fig. 12 is a plan view of the base element of one of the end sections of the slipper bearings shown in Fig. 4.
Figure 13:
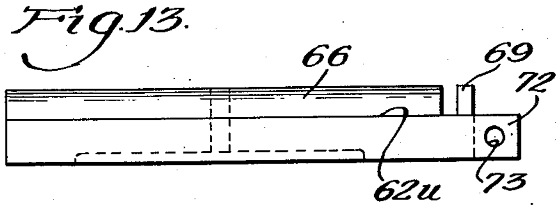
Fig. 13 is a side elevational view of the base section shown in Fig. 12.
Figure 14:
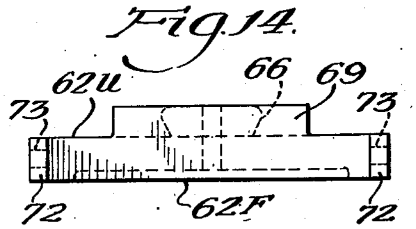
Fig. 14 is an end view, taken from the right in Fig. 12.
Figure 15:
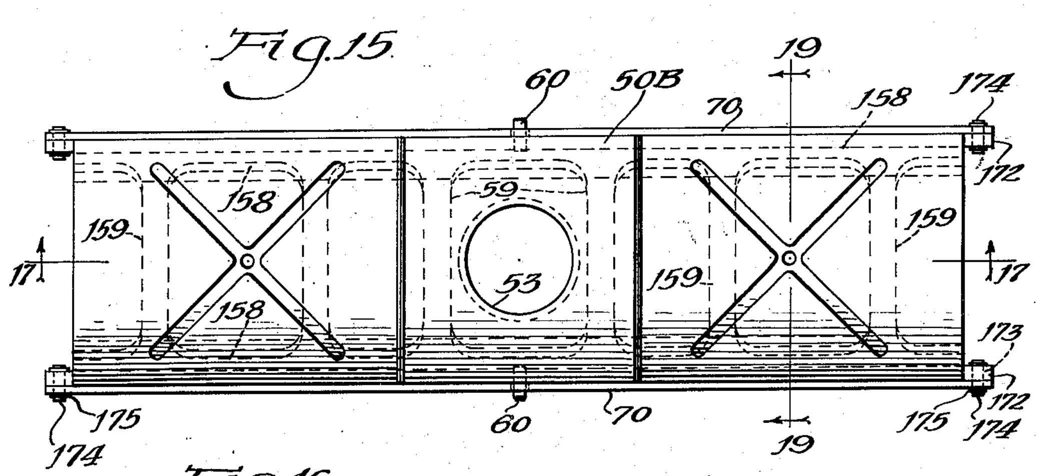
Fig. 15 is a plan view similar to Fig. 4 and illustrating another embodiment of the invention.
Figure 16:
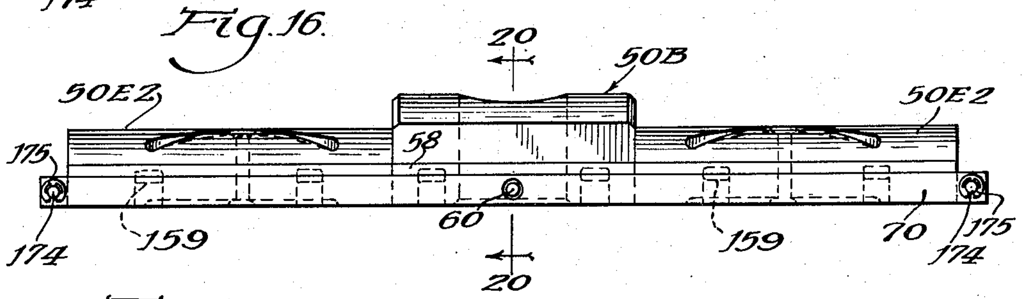
Fig. 16 is a side elevational view of the slipper bearing shown in Fig. 15.

Although any suitable bearing material may be utilized for the cap member 63, I prefer to form this cap member from a composition bearing material rather than from metal. In forming the cap member 63, means are afforded for cooperation with complemental means on the base member 62 for holding the two members in assembled relation, and in the form herein illustrated, these means are in the nature of a dovetail joint. Thus the upper surface of the base member 62 is generally flat as indicated at 62U in Figs. 12 to 14, and a longitudinal rib 66 is formed along the surface 62U to serve as a portion of the fastening means for assembling the members 62 and 63 of the end section. The rib 66 is of generally dovetail form, and is adapted to receive within a complemental dovetail groove 67 which is formed, as shown in Figs. 9 to 11, in the flat lower surface 63L of the cap member 63. Thus the cap member 63 may be put in position on the base member 62 by endwise movement in which the rib 66 is inserted into the dovetail groove 67, and under the present invention, this assembly is attained by movement of the cap member 63 in a right-hand direction. With respect to the base member 62 as viewed in Figs. 12 and 13. In the course of such an endwise assembly movement, the right hand end of the cap member 63 will engage an abutment wall 69 on the base 62 when the assembly movement has been completed, and as will hereinafter become apparent, the abutment wall 69 will, when the elements of the slipper bearing are assembled, serve to prevent disassembly of the cap element 63 with relation to the base member 62.

In forming a complete slipper bearing 50, one end section 50E is disposed opposite each end of the boss section 50B, and means are afforded for holding these three elements in assembled relationship. Such means are so formed and related to the elements of the slipper bearing that the end sections 50E may be removed and replaced while the coupling in which it is used remains in its coupled relationship, and under and in accordance with the present invention, these securing means are of such a character that they may be disposed entirely outside of the body of the various elements of the slipper bearing. Thus in accordance with the present invention, a pair of elongated and flat securing bars 70 are extended along the side edges of the boss section 50B and along the side edges of the end sections 50E, and in this connection, it should be observed that the arcuate and flat surfaces of the end sections 50E are connected by side edges 57E that are similar in form and relation to the side edges 57 of the boss section. The connecting bars 70, at substantially the midpoints thereof, are provided with apertures 71 which are arranged to embrace the supporting pins 60 that extend from the sides of the boss section 50B, and thus, so long as the bars 70 are held against the side edges 57 of the boss 50B, these bars will be held in assembled relationship with respect to the boss section 50B. The bars 70 extend somewhat beyond the ends of the end sections 50E of the slipper bearing, as will be evident in Figs. 4 to 6 of the drawings, and at the outer ends of the end sections, that is, the ends thereof at which the abutment walls 69 are located, these end sections have attaching ears 72 formed integrally with the base member 62. These attaching ears 72 are disposed at the outer corners of the base members 62 of the end sections so as to be parallel to and in contact with the ends of the connecting bars 70, and apertures 73 are formed in the ears 72 parallel to the ends of the end sections and parallel to the flat bearing surfaces of such end sections. Thus when the end section 50E is placed in position in abutment with the end of the boss section 50B, the apertures 73 in the ears 72 are aligned with corresponding openings formed in the ends of the connecting bars 70, and securing pins 74 are extended through each such pair of aligned openings, thereby to connect each ear 72 with the adjacent connecting strap 70. The pins 74 may of course be held in position by different types of securing means, but as herein shown, the pins 74 are held releasably in position by spring clips or washers 75 of conventional form that are engaged with suitable annular grooves formed in the connecting pins 74. When the parts of the bearing are thus assembled, the bars 70 are held against the side edges of the end sections and the boss section, and hence the bars 70 are held in position on the supporting pins 60. This of course holds the entire assembly together.

In the form of the invention shown in Figs. 1 to 14 of the drawings, the attaching ears 73 are formed integrally with the base member 62, and when the parts have been assembled in the manner indicated in Figs. 1 to 6 of the drawings, the end sections 50E will be held against the ends of the boss section 50B and will be supported through the action of the pins 60 so that the flat bearing surfaces 56 and 62F will be in substantial alignment. Hence when the two slipper bearings that are to be used in a coupling are mounted on a bearing pin 52, these two slipper bearings will be held in properly spaced relation within the female member of the coupling so as to thereby enable the tongue 30T to be readily inserted into position. When the two-part end sections are thus secured to a boss section 50B, the cap member 63 will be held against movement in one direction by engagement with the boss section, while the abutment wall 69 will prevent relative displacement in the other direction. When however it becomes necessary to replace a cap member 63, the end section of which it constitutes a part may be released by removal of the pins 74, and the entire end section may be withdrawn in an endwise direction from the coupling without the necessity for separating the coupling. The worn cap member may then of course be replaced on the base section 62, and the two-part end section may then be inserted into the coupling and connected to the connecting bars 70 by the connecting pins 74.

Although the two-part end section illustrated in Figs. 1 to 14 of the drawings is desirable in many installations, certain of the elements or aspects of the present invention may be utilized apart from the use of a two-part end section, and in Figs. 15 to 20 of the drawings, such an embodiment of the invention has been illustrated. In the embodiment illustrated in Figs. 15 to 20 of the drawings, the slipper bearing is made up of a boss section 50B of same construction as the boss section utilized in the previously described embodiment of the invention, and separately formed end sections 50E2 are associated with the boss section 50B by means of the supporting pins 60 and connecting bars 70 in substantially the same manner as hereinbefore described.

Figures 17, 18, 19, 20:
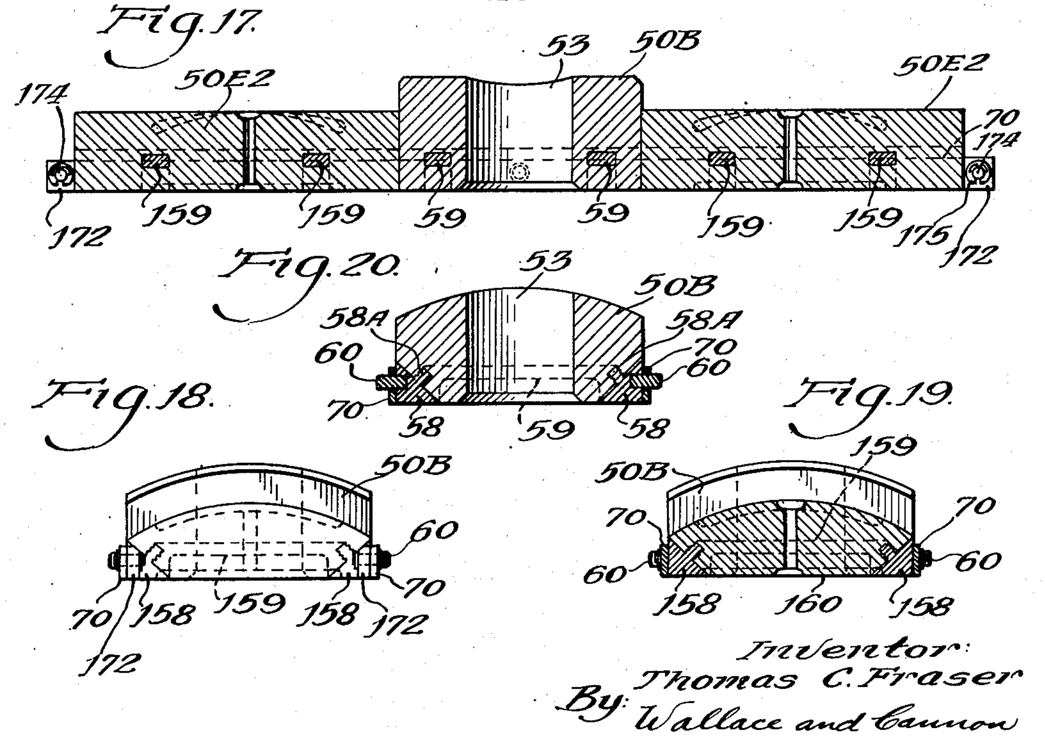
Fig. 17 is a longitudinal cross sectional view taken substantially along the line 17—17 of Fig. 15.
Fig. 18 is an end elevational view taken from the right in Fig. 15.
Fig. 19 is a transverse cross sectional view taken substantially along the line 19—19 of Fig. 15.
Fig. 20 is a transverse cross sectional view taken substantially along the line 20—20 of Fig. 16.

It has been pointed out hereinbefore that the boss section 50B is formed from a molded composition bearing material and that it has reinforcing corner beads 58 connected by cross members 59 that art molded into the material of the boss section. In Fig. 20 of the drawings a cross sectional view of the boss section 50B is shown, and it will be evident in this view that the corner beads 58 are of the same general form as the corner beads illustrated and described in the aforesaid Irvin Patent No. 2,361,629, it being observed however that the outer edges of these corner beads as utilized in the present instance are square rather than rounded as in the aforesaid Irvin patent. It will be recognized however that rounded edges may be utilized in many instances. It will be noted in Fig. 20 that the corner beads 58 have ribbed anchoring arms 58A formed thereon as described in the aforesaid Irvin patent so that these arms 58A will be effectually anchored in the course of the molding of the boss section 50B. In the aforesaid Irvin patent, the connecting arms that extend between two corner beads are separately formed, but in the present instance the connecting elements 59 have been illustrated as being permanently and integrally connected to the corner beads 58. The corner beads 58 serve in the present instance to support the pins 60, and as will be evident in Fig. 20, these pins 60 may be assembled or put in place on the respective corner beads 58 by a press fit in a suitable reamed bore.

The end sections 50E2 that are shown in Figs. 15 to 19 are also molded from a composition bearing material, and corner beads 158 are afforded therein in the same general manner as in the boss section 50B. The corner beads 158 are joined by a connecting member 159 that correspond in form and function with the connecting members 59, and hence the end sections 50E2 have permanently related corner beads along opposite edges thereof at the juncture of the flat bottom surface 160 with the side edges of the end sections. At the end of the end section which is to be disposed outwardly in the slipper bearing, the corner beads 158 are formed to afford connecting ears 172 which have bores 173 therein so that these ears correspond in form and function with the ears 72 in the previous described embodiment of the invention. When the slipper bearing shown in Figs. 15 to 20 is to be assembled, the end sections are disposed at opposite ends of the boss section 50B and the connecting bars 70 are put in place on the pins 60 of the boss section. The end sections are then connected to the bars 70 by pins 174 that are extended through the aligned openings in the bars 70 and the adjacent ears 172. Similar snap washers 175 are then put in place so as to hold the parts in the assembled relationship that has thus been established.

With this embodiment of the invention, the elements of the slipper bearing are held in assembled relation in the same manner as in the previous described embodiment, and when it becomes necessary to replace an end section 50E2, this may readily be done without disassembly of the coupling merely by removing the pins 174 so as to enable the end section to be removed in an endwise direction. After putting a new end section in position, the bars 70 are connected to the new end section, thereby to quickly condition the structure for normal use.

From the foregoing description it will be evident that the present invention enables the end sections of a multi-part slipper bearing to be held in place by means that do not extend through the body of the slipper bearing. In other words, the holding means are disposed entirely on the outside of the slipper bearing so that the slipper bearing has maximum strength, and with this arrangement there is no tendency to break the holding or securing means.

It will also be evident that under the present invention, the end sections of the slipper bearing may be formed in two parts so as to thereby enable the fast wearing elements of the end sections to be replaced. Under the present invention, the foregoing advantages are attained in such a way that replacement of worn elements of the slipper bearing may be attained without disassembly of the coupling in which the slipper bearing is used.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A slipper bearing for use in a universal coupling of the character described and comprising a medial boss portion, two separate end sections disposed at opposite ends of said boss section and extending therefrom, pins mounted in said boss section and protruding therefrom laterally with respect to said end sections, fastening bars carried by said pins and extending along the edges of said boss portion and said end sections, and means disposed at the remote ends of said end sections and securing the same to said fastening bars.

2. In a slipper bearing for use in a universal coupling of the character described, a medial boss section, two separate end sections disposed at opposite ends of said boss section and extending therefrom, and means supporting said sections in assembled relation comprising fastening bars extended along and outside of the exterior surfaces of the edges of said boss section and said end sections, and means detachably connecting said bars to the remote ends of said end sections and to said boss section.

3. In a slipper bearing for use in a universal coupling of the character described, a medial boss section, two separate end sections disposed at opposite ends of said boss section and extending therefrom, pins fitted in said boss section and protruding therefrom laterally with respect to said end sections, each of said end sections comprising an elongated and substantially rectangular body formed from metal to afford a flat bearing surface on one face thereof, a cap member comprising an elongated body of generally rectangular form disposed on and detachably secured to the other face of said base member and having an arcuate bearing surface formed on the exposed face thereof so as to extend from edge to edge of said cap member, and a pair of integral attaching ears extended from one end of said base member adjacent the corners thereof, fastening bars carried by said pins and extending along the edges of said boss portion and said end sections, and means connecting said ears of the respective end sections to the ends of said fastening bars.

4. In a slipper bearing for use in a universal coupling of the character described, a medial boss section, two separate end sections disposed at opposite ends of said boss section and extending therefrom, said end sections and said boss section being formed from molded composition bearing material and having metallic corner beads molded therein along longitudinal edges thereof, pins carried by the corner beads of said boss section and projecting therefrom laterally with respect to said end sections, fastening bars carried by said pins and extending along the edges of said boss portion and said end sections, connecting ears formed as extensions of the corner beads at the remote ends of said end sections, and means securing said ears detachably to said fastening bars.

5. In a boss section for use as an element of a multi-section slipper bearing or the like, and comprising an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads in a predetermined relation along the junctures of said connecting edge surfaces and said substantially flat surface so as to be spaced from said convex surface, and supporting pins extended from said reinforcing members at opposite edge surfaces of said member for cooperation with fastening means in holding end sections in assembled relation with respect to the boss section.

6. In a boss section for use as an element of a multi-section slipper bearing or the like, and comprising an elongated member formed to provide oppositely facing bearing surfaces, one of which bearing surfaces is substantially flat and the other of which is convex in the form of a segment of a cylindrical surface, said surfaces being joined by connecting edge surfaces, said member having a socket formed therein on an axis perpendicular to said flat surface and midway between the ends of the elongated member, and supporting pins extended from said opposite edge surfaces of said member on a common transverse axis that intersects with said first mentioned axis for cooperation with fastening means in holding end sections in assembled relation with respect to the boss section.

7. An end section for use as an element of a multi-section slipper bearing or the like and comprising an elongated member formed from non-metallic bearing material to provide oppositely facing bearing surfaces, one of which bearing surfaces is substantially flat and the other of which is convex in the form of a segment of a cylindrical surface, said surfaces being joined by connecting edge surfaces, metallic reinforcing members disposed as corner beads in a predetermined relation along the junctures of said connecting edge surfaces and said substantially flat surface so as to be spaced from said convex surface, and fastening ears extended integrally from said reinforcing members beyond one end of said body for cooperation with other fastening means in holding the end section in assembled relation with respect to other elements of such a slipper bearing.

8. In an end section for use as an element of a multi-part slipper bearing, an elongated and substantially rectangular body formed from metal to afford a flat bearing surface on one face thereof, a cap member comprising an elongated body of generally rectangular form, complemental dovetail means on said members extending longitudinally thereof and effective to detachably secure said cap member to the other face of said base member, said cap member having an arcuate bearing surface formed on the exposed face thereof so as to extend from edge to edge of said cap member, a pair of integral attaching ears extended from one end of said base member adjacent the corners thereof.

9. An end section for use as an element of a multi-part slipper bearing, said end section comprising a base member and a cap member both of generally rectangular form, cooperating dovetail means extended longitudinally on said members for detachably securing said members together in face to face relation in an assembly such that one face of each member is in an exposed position, said cap member having the exposed face of an arcuate form and said base member having its exposed face shaped to afford a flat bearing surface, means on said base member at one end thereof for securing said assembly to the boss section of a slipper bearing, and an abutment on said base member engaged with said cap member to limit movement of said cap member toward said one end of said base member.

10. A cap member for use as an element of a multi-part slipper bearing and comprising an elongated body of generally rectangular form and having an arcuate bearing surface formed on one face thereof so as to extend from edge to edge of said body, and said body being formed with a longitudinally extending undercut groove in the other face thereof and opening through at least one end of said body.

11. A cap member for use as an element of a multi-part slipper bearing and comprising an elongated body of generally rectangular form and having an arcuate bearing surface formed on one face thereof so as to extend from edge to edge of said body, and said body being formed with a longitudinally extending undercut groove disposed in a laterally centered relation in the other face thereof and opening through the ends of said body.

12. A base member for use as an element of an end section of a multi-part slipper bearing, an elongated and substantially rectangular body formed from bearing metal to afford a flat bearing surface on one face thereof, means on the opposite face thereof for holding a separately formed bearing member in position thereon, and a pair of integral attaching ears extended from one end of said body adjacent the corners thereof.

13. A base member for use as part of an end section of a multi-part slipper bearing, an elongated and substantially rectangular body formed from metal to afford a flat bearing surface on one face thereof, an integral and generally dovetail rib extended longitudinally along the other face of said body for holding a separately formed bearing member in position thereon, and a pair of integral attaching ears extended from one end of said body adjacent the corners thereof.

14. A base member for use as part of an end section of a multi-part slipper bearing, an elongated and substantially rectangular body formed from metal to afford a flat bearing surface on one face thereof, an integral and generally dovetail rib extended longitudinally along the other face of said body for holding a separately formed bearing member in position thereon, an abutment formed on said other face of said body adjacent one end thereof and of a width greater than said rib, and a pair of integral attaching ears extended from one end of said body adjacent the corners thereof.

15. A base member for use as part of an end section of a multi-part slipper bearing, an elongated and substantially rectangular body formed from metal to afford a flat bearing surface on one face thereof, an integral and generally dovetail rib extended longitudinally along the other face of said body for holding a separately formed bearing member in position thereon, an abutment formed on said other face of said body adjacent one end thereof for limiting endwise movement of such a separately formed bearing member, and a pair of integral attaching ears extended from one end of said body adjacent the corners thereof.

THOMAS C. FRASER.

REFERENCES CITED

The following references are of record in the file of this patent:

UNITED STATES PATENTS

| Number | Name | Date |
|---|---|---|
| 1,158,436 | Bowen | Nov. 2, 1915 |
| 1,516,914 | Croft et al. | Nov. 25, 1924 |
| 2,305,696 | Healy | Dec. 22, 1942 |
| 2,305,698 | Irvin | Dec. 22, 1942 |
| 2,305,701 | Irvin | Dec. 22, 1942 |
| 2,305,703 | Smith | Dec. 22, 1942 |
| 2,361,629 | Irvin | Oct. 31, 1944 |